US008340262B1

(12) United States Patent
Cermak et al.

(10) Patent No.: US 8,340,262 B1
(45) Date of Patent: Dec. 25, 2012

(54) HOME CALL ROUTER

(75) Inventors: Gregory Wayne Cermak, Needham, MA (US); Bernadette Anita Nelson, Lexington, MA (US); Sandra Kelly Teare, Needham, MA (US); Alex Tserkovny, Brookline, MA (US); John Herman Wurster, Basking Ridge, NJ (US); Douglas Reynold Jones, Medford, NJ (US); Linda Louise Witham, Annandale, VA (US); Stephen Paul Brennan, Bedford, TX (US); Premkumar Natarajan, Sudbury, MA (US); Anne M. Kraus-Keenan, Mountain Lakes, NJ (US); Elizabeth I. Van Horn, Philadelphia, PA (US)

(73) Assignee: Verizon Services Corp., Ashburn, VA (US)

( * ) Notice: Subject to any disclaimer, the term of this patent is extended or adjusted under 35 U.S.C. 154(b) by 1834 days.

(21) Appl. No.: 11/280,325

(22) Filed: Nov. 17, 2005
(Under 37 CFR 1.47)

Related U.S. Application Data

(60) Provisional application No. 60/629,170, filed on Nov. 18, 2004.

(51) Int. Cl.
*H04M 3/42* (2006.01)

(52) U.S. Cl. .......... 379/201.01; 379/211.01; 379/207.13
(58) Field of Classification Search ................. 379/188, 379/196, 201.01, 207.02, 211.01, 212.01, 379/207.03, 207.16, 210.02, 210.01, 88.18, 379/215.01, 208.01, 211.02
See application file for complete search history.

(56) References Cited

U.S. PATENT DOCUMENTS

| | | | | |
|---|---|---|---|---|
| 5,999,613 A * | 12/1999 | Nabkel et al. | ............ | 379/215.01 |
| 6,061,559 A * | 5/2000 | Eriksson et al. | ........... | 455/435.3 |
| 6,587,555 B1 * | 7/2003 | Cripe et al. | ............. | 379/211.02 |
| 7,065,203 B1 * | 6/2006 | Huart et al. | ............. | 379/266.06 |
| 7,200,215 B2 * | 4/2007 | Brown et al. | ........... | 379/210.01 |
| 7,403,600 B2 * | 7/2008 | Koch et al. | ................. | 379/88.18 |
| 7,420,962 B2 * | 9/2008 | Das et al. | ...................... | 370/352 |
| 7,466,978 B1 * | 12/2008 | Chapman et al. | .......... | 455/422.1 |
| 2002/0034280 A1 * | 3/2002 | Infosino | ..................... | 379/88.02 |
| 2002/0064266 A1 * | 5/2002 | Kaplan | ....................... | 379/156 |
| 2002/0126821 A1 * | 9/2002 | Barak et al. | .................... | 379/219 |
| 2003/0185372 A1 * | 10/2003 | Henz | ........................ | 379/207.02 |
| 2004/0022381 A1 * | 2/2004 | Turner | ..................... | 379/211.01 |
| 2006/0072726 A1 * | 4/2006 | Klein et al. | ............... | 379/201.01 |

\* cited by examiner

*Primary Examiner* — Yuwen Pan
*Assistant Examiner* — Sonia Gay

(57) ABSTRACT

Disclosed is a method and system for routing telephone calls within a household. In the disclosed home call routing system, a head of the household or other person with administrative authority within the home can control the routing of telephone calls by establishing and modifying call system parameters such as call priorities, traffic times, caller identities, routing rules, etc. through a home computer.

20 Claims, 4 Drawing Sheets

HOME CALL ROUTER

CROSS-REFERENCE TO RELATED APPLICATIONS

This application claims the benefit of U.S. Provisional Application No. 60/629,170, entitled "Home Call Route", filed on Nov. 18, 2004, and incorporates such application by reference in its entirety.

BACKGROUND

Competition for telecommunications resources within the home can be fierce. For example, many parents find that, no matter how many lines they have, including broadband access, their teenagers always commandeer all available telecommunications resources for much of the time, especially in the evenings when parents oftentimes desire to use the phone themselves. People sharing telecommunications resources want to be able to easily have those resources available without argument and disagreement, e.g., parents want to get their children off the phone (or off the phone line) without an unnecessary confrontation. Accordingly, a system is needed to help allocate telecommunications resources reasonably among those living together in a home.

Moreover, people within a household presently spend valuable time answering telephone calls for one another, or worse, fail to take the time to pass along messages once a call has been answered. For example, many parents want to stop expending time answering repeated phone calls for their children, while ensuring that their own phone calls will get through or messages for them will be delivered. Therefore, a need exists for a system and method for automatic routing and management of telephone calls in a household.

BRIEF DESCRIPTION OF THE SEVERAL VIEWS OF THE DRAWING(S)

Reference will be made to the accompanying drawings, which are not necessarily drawn to scale, and wherein.

Figure 1:
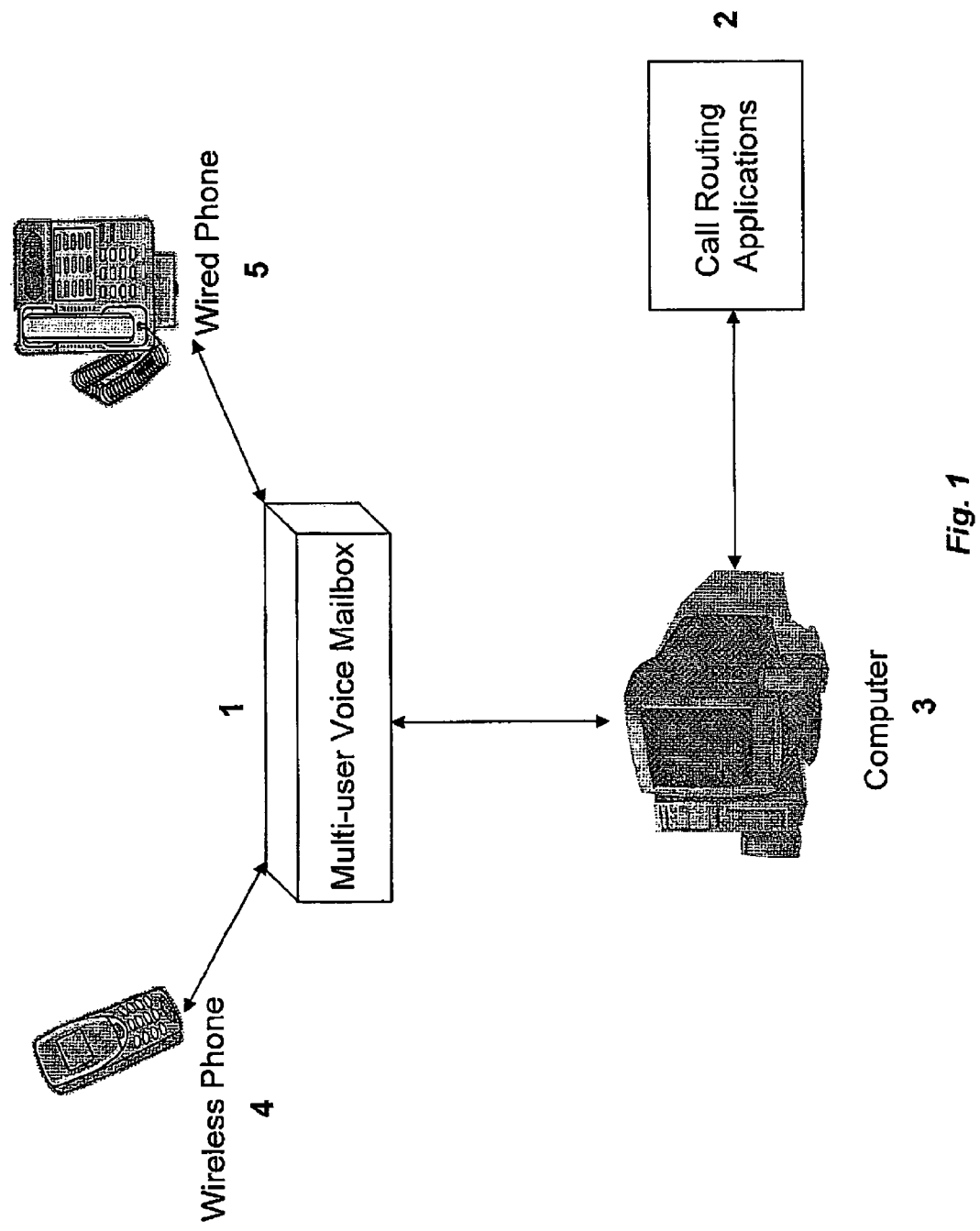
FIG. 1 is a high-level view of the architecture of a home call routing system according to one embodiment of the present invention.
Figure 3:
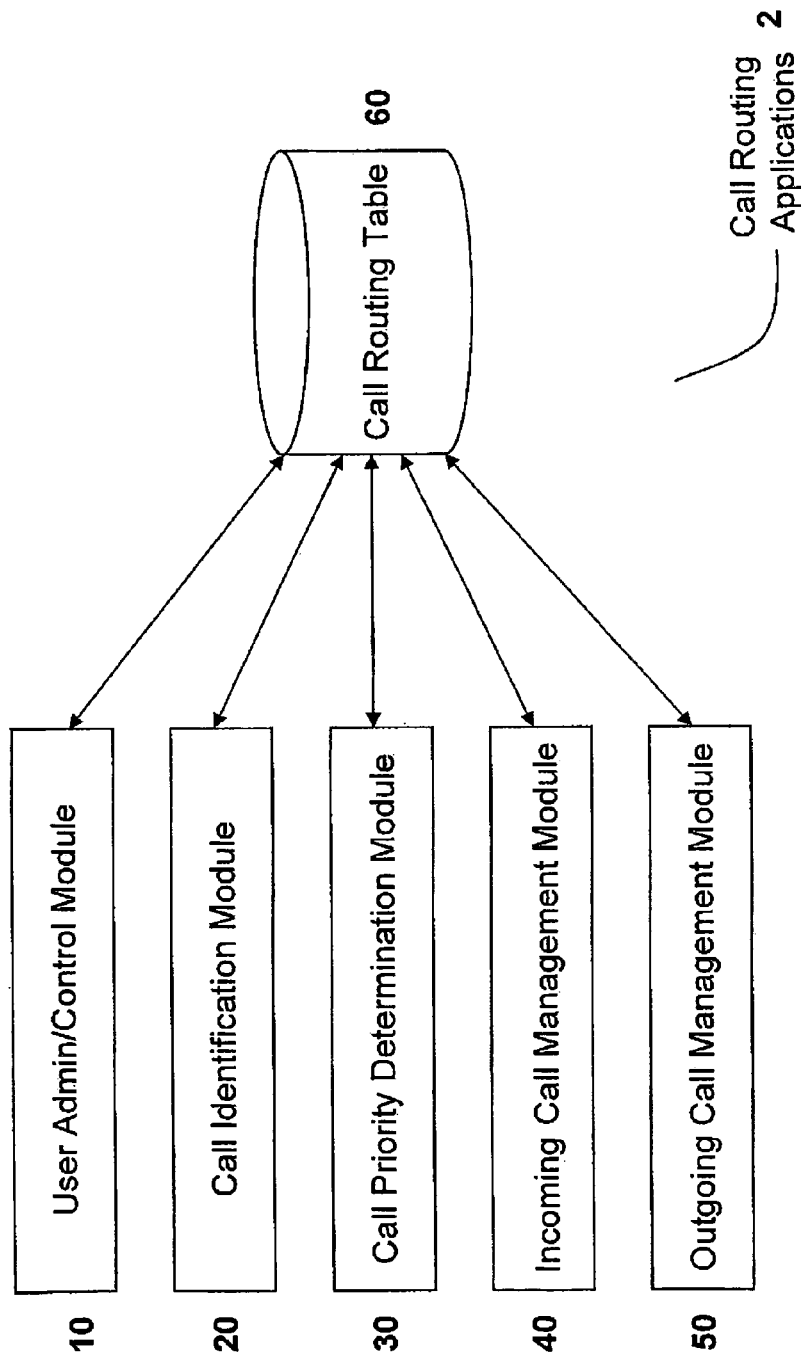
Figure 4:
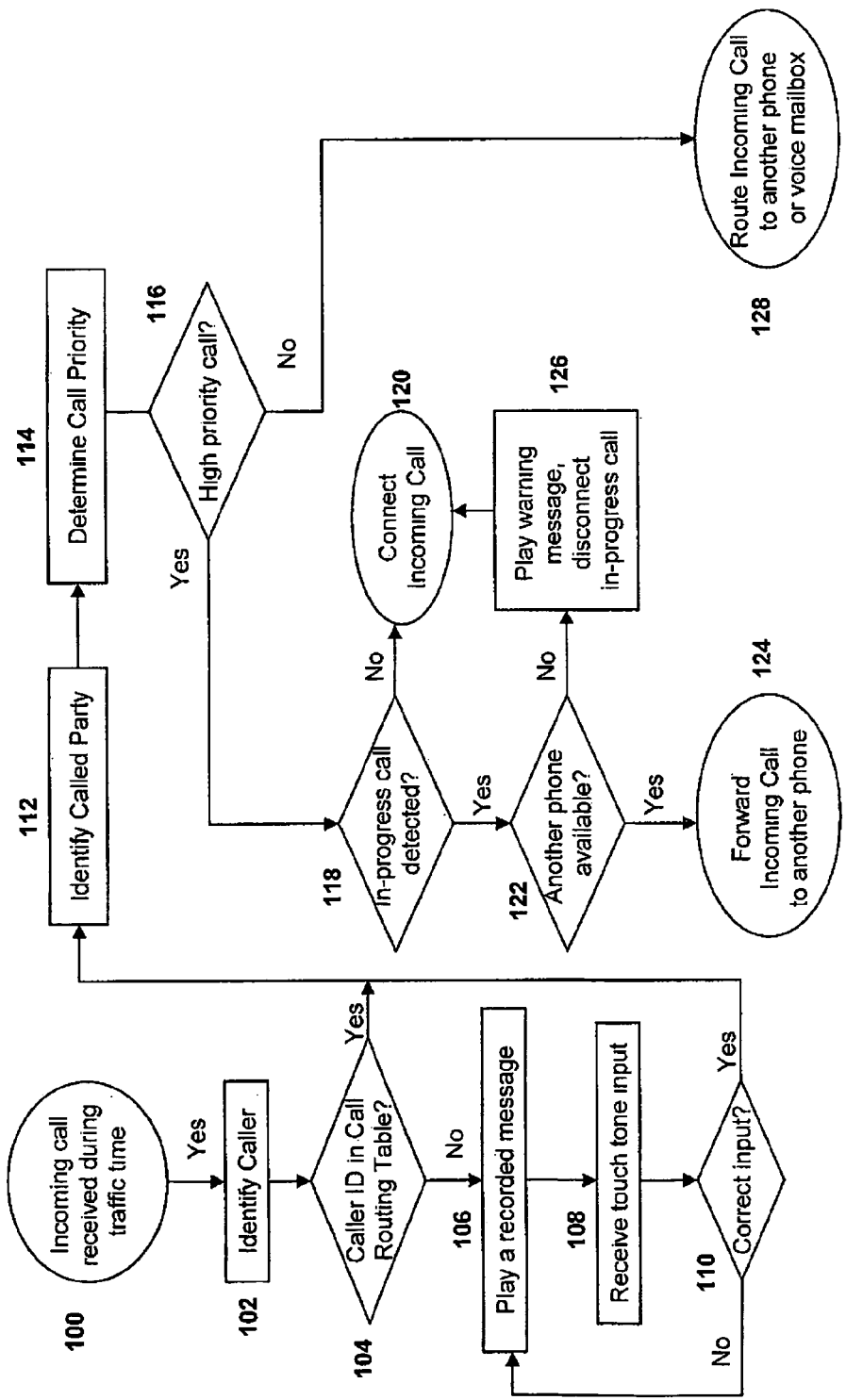

FIG. 3 presents a number of application modules for call routing in the system in FIG. 1 according to one embodiment of the present invention; and FIG. 4 is a process flow diagram illustrating the call routing algorithm employed by the system in FIG. 1 according to one embodiment of the present invention.

DETAILED DESCRIPTION OF PREFERRED EMBODIMENTS

The preferred embodiments now will be described hereinafter with reference to the accompanying drawings, in which exemplary embodiments and examples implemented according to the invention are shown. Like numbers refer to like elements throughout.

Turning to FIG. 1, a high-level architectural view of a home call routing system according to one embodiment of the present invention will be described. As seen in FIG. 1, the home call routing system of this embodiment is comprised of a multi-user voice mailbox 1, call routing applications 2, a computing device 3, and a wireless phone 4 and/or wired or landline phone 5. The multi-user voice mailbox 1, such as will be known to those skilled in the art, may be advantageously enhanced so that it can be accessed from any home landline phone, namely, the wired phone 5, or any wireless phone 4 (for example, via a communications network). Different individuals may have their own separate portions or compartments of the mailbox 1 with their own access numbers. In practice, the multi-user voice mailbox 1 provides a message to an incoming caller such as "If you are calling for (name), please press 1. If you are calling for (another name), please press 2." The message could continue for additional names, or could say "for anyone else, please press 7." The call goes through to the main home phone, to another phone, or to the appropriate part of the voice mailbox 1 depending on which button was pressed and the current configuration of the system as described below. In one embodiment, the system uses speech recognition in place of dialed digit identification for identifying the called party.

As will be described below, by means of the call routing applications 2, a head of the household or other person with administrative authority within the home can control the routing of telecommunications, for example, which telephone calls should be received at a telephone within the home and which should be sent to other destinations such as voicemail or to other phones within or outside the home. Additionally, the routing plan for a telephone call may dictate that several actions should be taken in a predefined sequence, such as by transferring to a particular voice mail box only after ringing one or more telephones. Such control is accomplished by the head of household or the person with administrative authority within the home who can establish, control and modify system parameters such as call priority, traffic times of call priority, etc., through the computing device 3 that is configured to execute the call routing applications 2. This computing device 3 can be a desktop computer, a laptop computer, a handheld device such as a PDA (Personal Digital Assistant) or any other suitable computing device. In embodiments using a computer, a user logs on to an application providing administrative functionality, typically inputs a PIN or is otherwise authenticated, and enters necessary information for call routing in a self-explanatory form. In alternative embodiments, call routing parameters can be modified by using a telephone keypad. Further information regarding the call routing information collected and administered by the call routing applications is provided below.

Figure 2:
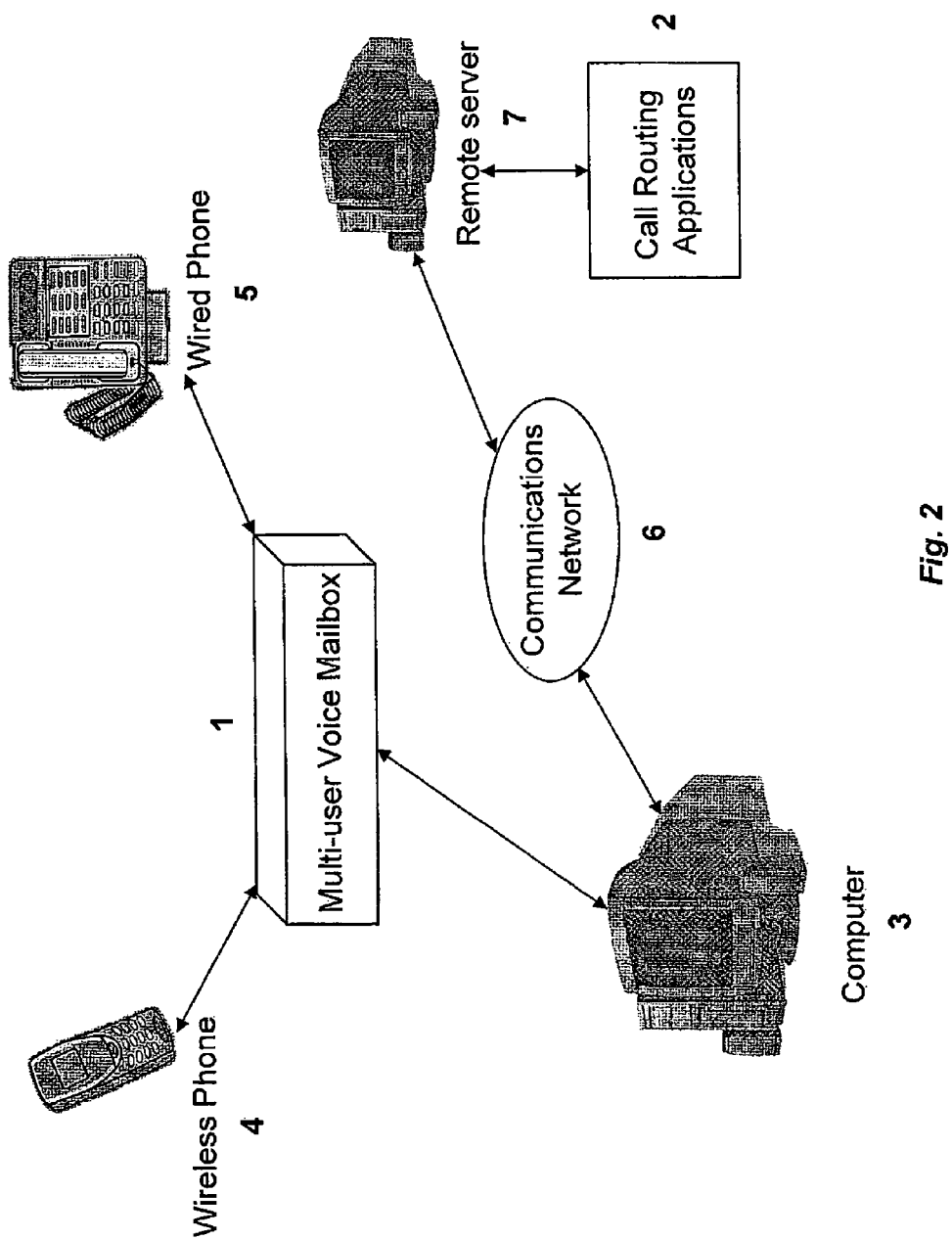
FIG. 2 is a high-level view of an alternative architecture of the system in FIG. 1 according to one embodiment of the present invention.

FIG. 2 presents an alternative embodiment of the system architecture. As compared with the embodiment illustrated in FIG. 1, the home call routing system in FIG. 2 further comprises a remote web server 7 in communication with the computer 3 via a communications network 6, such as the Internet. Typically, the remote web server 7 is operated by a telecommunication company or a third-party application service provider that provides the call routing applications 2 for their customers through an online user interface. In other words, each user's computer 3 does not need to be pre-configured with the call routing applications 2. Instead, the call routing applications 2 are installed and maintained on the remote web server 7. Therefore, as long as the computer 3 has access to the remote web server 7 over the communications network 6, a user can establish the above-mentioned system parameters from the computer 3 after the user logs on to an online application providing administrative functionality, inputs a PIN or is otherwise authenticated, and enters necessary information in a self-explanatory form.

As shown in FIG. 3, the call routing applications 2 of one embodiment are comprised of a number of functionality modules interacting with a call routing table 60 that is established by the head of the household or other person with administrative authority within the home. As a result of the functionality of the call routing applications 2, the computing device that executes the call routing applications is typically considered the call router. Thus, the call router may be the computing device 3, the remote server 7 or other computing devices depending upon the system configuration. The call router may constitute multiple computing devices having portions of applications 2 distributed amongst them. Among these functionality modules, a user administration module 10 is accessible via the computer 3 and is configured for a user with administrative authority to establish system parameters such as call priorities, traffic times, caller identifiers for frequently-received calls, etc. These parameters are then provided to the other various modules and/or to the routing table as described below.

A call identification module 20 is configured for identifying the source and type of any incoming calls. As an example, for each of the frequently-received calls, the call identification module 20 identifies the specific caller (e.g., incoming call number), such as by automatic number recognition (e.g., using Caller ID information), and determines who the called party is by looking to the call routing table 60. If the incoming caller is unknown, the module 20 starts to play a pre-recorded message inviting a touch tone input or a voice input from the caller and then determines the called party based upon the touch tone input or the voice input.

The call priority determination module 30 determines the priority of any incoming call according to the pre-established call priority. For example, calls to parents or the head of the household may be set with high priorities and should always get through, while calls to children may have low priorities and be connected only in select conditions. When it is the pre-defined traffic time or the home phone line is busy, those low priority calls may be routed to a child's mobile phone, if any, or to a child's voice mailbox in accordance with the routing rules described below.

The incoming call management module 40 is programmed to route incoming calls based upon the pre-determined call parameters, such as identifications of the caller and called party under the module 20, call priorities under the module 30, and pre-defined routing rules in the call routing table 60. The routing rules provide detailed instructions about where to route an incoming call that is determined not to be answered immediately. The destination for call routing can be another phone available within or outside the home, a mobile phone, or a personal voice mailbox. The routing rules are supplied by the system administrator, usually the head of a household, through the user administration module 10.

Sometimes an incoming call of high priority cannot be connected because the home phone lines are occupied by outgoing calls. In that instance, at least one of the outgoing calls needs to be disconnected so as to allow the high priority incoming call to be received. Another instance is, during a pre-designated traffic time, e.g., 7 pm-9 pm, any outgoing calls would be blocked in order to ensure that an important incoming call is not missed. In all those instances involving outgoing calls, the system triggers the outgoing call management module 50. Specifically, the module 50 is configured to detect the identity of the person on the outgoing call by virtue of voice recognition, previous entry of a personal identity code (PIN), or other means that may be known to those skilled in the art. If an outgoing call is to be disconnected, the identification of the people making outgoing calls permits the system to determine which one of the outgoing calls is to be released, again generally based upon a priority ranking provided by the system administrator, to permit an incoming call to be received. The module 50 may be further configured to play a pre-recorded warning message before disconnecting the outgoing call. Meanwhile, the incoming call will be put on call waiting before it is connected to allow the system an opportunity to release the outgoing call. In one embodiment, the system plays a recording to the caller of the incoming call, that the call will be connected momentarily.

The call routing table 60 contains various system parameters for use in the operations of the above-described modules. In an exemplary embodiment, the call routing table 60 as populated by the system administrator through the user administration module 10 may include the following system parameters (provided below with example parameters):

Call Routing Table

| Called Party | Call Priority | Called Party Number | Voice Mailbox Index | Routing Rules . . . |
|---|---|---|---|---|
| David (Dad) | 1 | 404-881-7000<br>615-770-3453<br>. . . | 1 | 1$^{st}$ option: route to mobile phone 770-811-7070<br>2$^{nd}$ option: route to work phone 404-881-4325<br>3$^{rd}$ option: route to voice mailbox 1<br>. . . |
| Mary (Mom) | 1 | 312-454-4333<br>917-442-4546<br>. . . | 2 | |
| Bob (Elder brother) | 2 | | 3 | 1$^{st}$ option: route to mobile phone 770-811-4321 . . .<br>2$^{nd}$ option: route to voice mailbox 3 |
| Grace (Younger sister) | 3 | | 4 | |
| Peter (Younger brother) | 3 | | 5 | |

As exemplified above, if the system identifies the Called Party Number as from the phone number of 404-881-7000, the called party can be automatically determined to be "David (Dad)" and the call priority is determined to be "1", meaning the first priority. If this incoming call cannot be connected because a child, e.g., Bob, is occupying the home phone line on another incoming call, then Bob's call can be routed according to the routing rules, either to his mobile phone 770-811-4321 as the first choice, or Bob's voice mailbox as the second choice. In this instance, the system would typically notify Bob that the current call was being redirected first to his mobile phone, and if that proved unsuccessful, to voice mail. In the meantime, the caller for David would be informed that the incoming call would be completed momentarily. If another call subsequently came in for David while he was still on the phone with the first call, the subsequent call could be routed in accordance with the various routing rules defined by the call routing table for David.

While a single call routing table is shown above, multiple call routing tables may be defined by the system administrator for different, respective periods of time or for different days of the week. For example, a first call routing table may be defined from 8 AM to 5 PM on weekdays, a second call routing table may be defined from 5 PM to 10 PM on weekdays, a third call routing table may be defined from 10 PM to 8 AM on weekdays and a fourth call routing table may be defined for Saturday and Sunday. Depending upon the time at which the incoming call arrives, the incoming call is then processed in accordance with the appropriate call routing table. Alternately, a single call routing table can be used which includes time-of-day routing information, although this may increase the complexity of the routing table.

With reference to the flow chart in FIG. 4, the step-by-step process for routing home phone calls will be described. At Step 100, an incoming call is received during a certain time on a certain day, directed to a main home phone line. In practice, a parent in a household may choose to designate a particular time, e.g., 7-9 pm on weekdays, as the high traffic time during which the priority system is activated such that the phone calls intended for "high priority" household members (e.g., the parent) are given priority over all other calls to "low priority" household members (e.g., calls intended for children in the household). The system is configured to determine for whom in the household the call is intended through Steps 102-114. At Step 102, the system first identifies the caller using the "Caller ID" technology that is known in the art. Then the system looks to the appropriate routing table 60 as described above to retrieve a data record matching the identified caller in Step 104. If the caller is included in the call routing table 60, the system continues to identify the called party as shown at Step 112. Taking the above exemplified routing table for example, if the Called Party Number is identified as the phone number 404-881-7000, the system will determine this phone call is intended for "David (Dad)". But if the Calling Party Number is unavailable or if the routing table does not include an entry associated with the phone number of the incoming call, at Step 106 the system causes a recording to be played for the calling party to enable the determination of for whom in the household the call is intended. In exemplary embodiments, the recording message can be: "If you are calling for (name), please press 1. If you are calling for (another name), please press 2." The message could continue for additional names, or could say "for anyone else, please press 7." In response to the recorded message, at Step 108 the caller can provide a touch tone input or voice input to identify the intended called party. At Step 110, the received input will be verified. If the input is invalid, e.g., the caller pressing a wrong button, or the voice input being unrecognizable, the system goes back to Step 106 and repeats the recorded message. Upon a valid touch tone input, the system identifies the called party at Step 112. The caller input is typically provided by pressing buttons on a telephone keypad. In one embodiment, the system also uses speech recognition in place of pushing buttons for determining the called party.

Once the called party is identified, at Step 114 the system continues to determine the call priority according to the pre-defined parameters in the call routing table 60. Using the above-mentioned example, the incoming phone call for David (Dad) is pre-set as the top priority call during the traffic time. Accordingly, the subsequent processing of this incoming call is governed by the call routing rules specifically defined for David (Dad)'s incoming calls, as indicated in call routing table 60, and by the rules applicable to a high priority call. As embodied in the flow chart of FIG. 4, the process of routing a call that is determined to be a high priority call 116 comprises a few or all of the Steps 118-126. Other incoming calls with lower priorities can be routed to another available phone or voice mailbox as shown at Step 128. For example, if an incoming call is received for a child other than the parent in the household, the incoming call could be routed either to a child's mobile telephone (if there is one) or to a child's personal home voice mailbox. If a call goes to voicemail, then a recorded message will tell the caller that the home phone system is unavailable at the moment. Alternatively, call processing may permit lower priority calls to be connected when the main home phone is available, subject to later interruption by higher-priority incoming calls (as described further below). Whether a call is a high or low priority call may be determined absolutely, based on a preset threshold (e.g., all calls below priority level two are low priority), or relatively in comparison to existing in-progress calls, as will be apparent from the description below.

To ensure a high priority call is connected, the system also needs to detect whether the home phone line is occupied by any calls. At Step 118, the system detects whether a person is on a call and further this person's identity using voice recognition, entry of a personal identity code (PIN), or other means that may be known to those skilled in the art. In some embodiments, individuals' voices are recorded periodically, and voice recognition or voice identification is used to determine who is speaking on outgoing calls. Alternatively or additionally, the head of household or administrative user can use a PIN or other protection code to place priority outgoing calls that cannot be interrupted by other calls, even if such other calls are for a priority user. Accordingly, if children do not have the priority PIN, for example, their calls can be interrupted during specified times if there is an incoming call for a priority user such as a parent.

If the system determines that the main home phone is available without any in-progress call, the incoming call will be connected to the main home phone at Step 120. When the call is connected at Step 120, the telephone may sound a ring that distinctively identifies the call as being for the parent with call priority. Otherwise, as shown at Step 122, the system may look for another phone to which the incoming call may be forwarded, e.g., another home line or a mobile phone. If another phone is available, the system forwards the incoming call to that phone at Step 124. But if no other phone is available and the call is a high priority call (or a higher priority call than the in-progress call), at Step 126 the system plays a recording to the caller saying that the incoming call will be connected momentarily. Meanwhile, a warning may be provided to the in-progress call, indicating the imminent disconnection of the call in favor of the high priority call. The warning may take the form, for example, of a tone similar to those used with call waiting functionality presently known in the art. After the warning is provided, the in-progress call is disconnected from the main home phone, and the high priority call is connected. Additionally, the in-progress call may be automatically transferred to another phone associated with the person of the household on the call, e.g., to the mobile phone of a child who is on the call. In this case, the warning may be in the form of a message indicating that the call will be transferred to the alternate phone (possibly identifying the phone by label or number) and then using the facilities of the phone network to ring and connect the in-progress call to the alternate phone. Where the alternate phone is not available, the system may attempt to connect to other alternate phones associated with the person on the in-progress call, and ultimately disconnect the call or send the call to a voice mailbox if a connection cannot be made.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method for routing telephone calls, said method comprising:

identifying a called party of a household having multiple parties associated with an incoming call to a telephone line terminating at the household;

accessing call routing parameters for routing telephone calls to the telephone line, the call routing parameters including a plurality of call priorities, each of the multiple parties in the household being assigned one of the plurality of call priorities wherein a call for a called party assigned to a higher priority is connected in favor of a call for a called party assigned to a lower priority;

responsive to the identification of the called party, determining a call priority of the incoming call from the one of the plurality of call priorities assigned to the called party; and based in part upon the call priority of the incoming call, routing the incoming call according to a set of predefined call routing rules, wherein the routing the incoming call comprises detecting an in-progress call on the telephone line, identifying a party of the household associated with the in-progress call by recognizing a recorded voice during the in-progress call and based on the call priority, determining whether to disconnect the in-progress call.

2. The method of claim 1, further comprising:

designating a traffic time during which incoming calls to a particular party of the multiple parties are given priority over all other incoming calls to the telephone line; and determining whether the incoming call is received during the traffic time.

3. The method of claim 1, further comprising:

designating a traffic time during which a protection code is required in order to make an outgoing call using the telephone line; and determining whether the outgoing call is requested during the traffic time.

4. The method of claim 1, wherein identifying the called party includes:

determining whether a calling party of the incoming call can be identified, and if so, identifying the called party from the multiple parties based in part upon the identified calling party; otherwise, playing a recording to invite an input from the calling party of the incoming call, the input comprising at least one of a touch tone input and a voice input, and identifying the called party based upon the input from the calling party.

5. The method of claim 1, wherein routing the incoming call further includes routing the incoming call to an alternative telephone line terminating at the household or a voice mailbox of the called party when the call priority is determined to be below a threshold.

6. The method of claim 1, wherein routing the incoming call further includes:

determining whether another telephone line terminating at the household is available;

responsive to a determination that the other telephone line is available, forwarding the incoming call to the other telephone line; and responsive to a determination that the other telephone line is not available, when the call priority of the incoming call is determined to be above a priority of the in-progress call, disconnecting the in-progress call with a warning and connecting the incoming call via the telephone line.

7. The method of claim 6, wherein routing the incoming call further includes:

transferring the in-progress call to an alternative telephone line that does not terminate at the household.

8. The method of claim 7, wherein the warning includes a message indicating that the in-progress call will be transferred.

9. A system for routing telephone calls, said system comprising:

a computing device configured to receive call routing parameters from a user, the call routing parameters including a plurality of call priorities, wherein one of the plurality of call priorities is assigned to each of multiple parties in a household served by a first telephone line of a communications network, and a call router coupled to the computing device, the call router configured to:

identify a called party of the multiple parties that is associated with an incoming call of the first telephone line;

responsive to the identification of the called party, determine a call priority of the incoming call from the plurality of call priorities wherein a call for a called party assigned to a higher priority is connected in favor of a call for a called party assigned to a lower priority; and based in part upon the call priority of the incoming call, route the incoming call according to a set of call routing rules, the call routing rules including at least a portion of the call routing parameters, wherein the routing the incoming call comprises: detecting an in-progress call on the telephone line, and identifying a party of the household associated with the in-progress call by recognizing a recorded voice during the in-progress call and based on the call priority, determining whether to disconnect the in-progress call.

10. The system of claim 9, further comprising a multi-user voice mailbox customized for the multiple parties in the household, wherein the multi-user mailbox is accessible from one or more wired or wireless telephones connected to the communications network.

11. The system of claim 9, wherein the computing device comprises the call router.

12. The system of claim 9, wherein the computing device is remote from the call router and is configured to communicate with the call router over the communications network.

13. The system of claim 9, wherein the call router is further configured to:

designate a traffic time during which calls to a particular party of the multiple parties in the household are given priority over all other calls to the first telephone line; and determine whether the incoming call is received during the traffic time.

14. The system of claim 9, wherein the call router is further configured to:

determine whether a calling party of the incoming call can be identified, and if so, identify the called party from the multiple parties based in part upon the identified calling party; otherwise, play a recording to invite an input from the calling party, the input comprising at least one of a touch tone input and a voice input; and identify the called party based upon the input from the calling party.

15. The system of claim 9, wherein the call router is further configured to route the incoming call to a second telephone line of the communications network terminating at the household that is available, or to a voice mailbox of the called party when the call priority is below a threshold.

16. The system of claim 9, wherein the call router is further configured to:
   determine whether a second telephone line of the communications network terminating at the household is available;
   responsive to a determination that the second telephone line is available, forward the incoming call to the second telephone line; and
   responsive to a determination that the second telephone line is not available, when the call priority of the incoming call is determined to be above a priority of the in-progress call, disconnect the in-progress call with a warning and connect the incoming call via the first telephone line.

17. The system of claim 16, wherein the call router is further configured to: transfer the in-progress call to an alternative telephone line.

18. The system of claim 17, wherein the warning includes a message indicating that the in-progress call will be transferred.

19. A method for routing telephone calls, said method comprising:
   (1) receiving an attempt to connect an incoming call via a telephone line terminating at a household;
   (2) identifying a called party of the incoming call based upon an identification or an input of a calling party of the incoming call, wherein the input is a touch tone input or a voice input, the called party being one of multiple parties in the household;
   (3) responsive to the identification of the called party, searching a call routing table to determine a call priority of the incoming call, the call routing table including a plurality of call priorities, wherein one of the plurality of call priorities is assigned to each of the multiple parties in the household wherein a call for a called party assigned to a higher priority is connected in favor of a call for a called party assigned to a lower priority;
   (4) determining whether the incoming call is received during a pre-designated traffic time; and
   (5) responsive to the determination that the incoming call is received during the pre-designated traffic time, routing the incoming call according to a set of pre-defined call routing rules when the call priority of the incoming call is determined to be below a threshold; otherwise connecting the incoming call to the called party via the telephone line, wherein the routing the incoming call comprises: detecting an in-progress call over the telephone line during the pre-designated traffic time and identifying a party of the household associated with the in-progress call by recognizing a recorded voice during the in-progress call and based on the call priority, determining whether to disconnect the in-progress call.

20. The method of claim 19, wherein Step (5) further includes:
   detecting the in-progress call over the telephone line during the pre-designated traffic time when the call priority of the incoming call is determined to be equal or above the priority of the in-progress call; and
   disconnecting the in-progress call with a warning prior to connecting the incoming call to the called party via the telephone line.

* * * * *